No. 668,331. Patented Feb. 19, 1901.
E. HANCOX.
PIPE MAKING MACHINE.
(Application filed Sept. 22, 1900.)
(No Model.) 8 Sheets—Sheet 1.

Witnesses.
Albert E. Hill.
William Hadlet.

Inventor.
Edwin Hancox.

No. 668,331. Patented Feb. 19, 1901.
E. HANCOX.
PIPE MAKING MACHINE.
(Application filed Sept. 22, 1900.)
(No Model.) 8 Sheets—Sheet 2.

Witnesses.
Albert E. Hill.
William Hadlet.

Inventor.
Edwin Hancox.

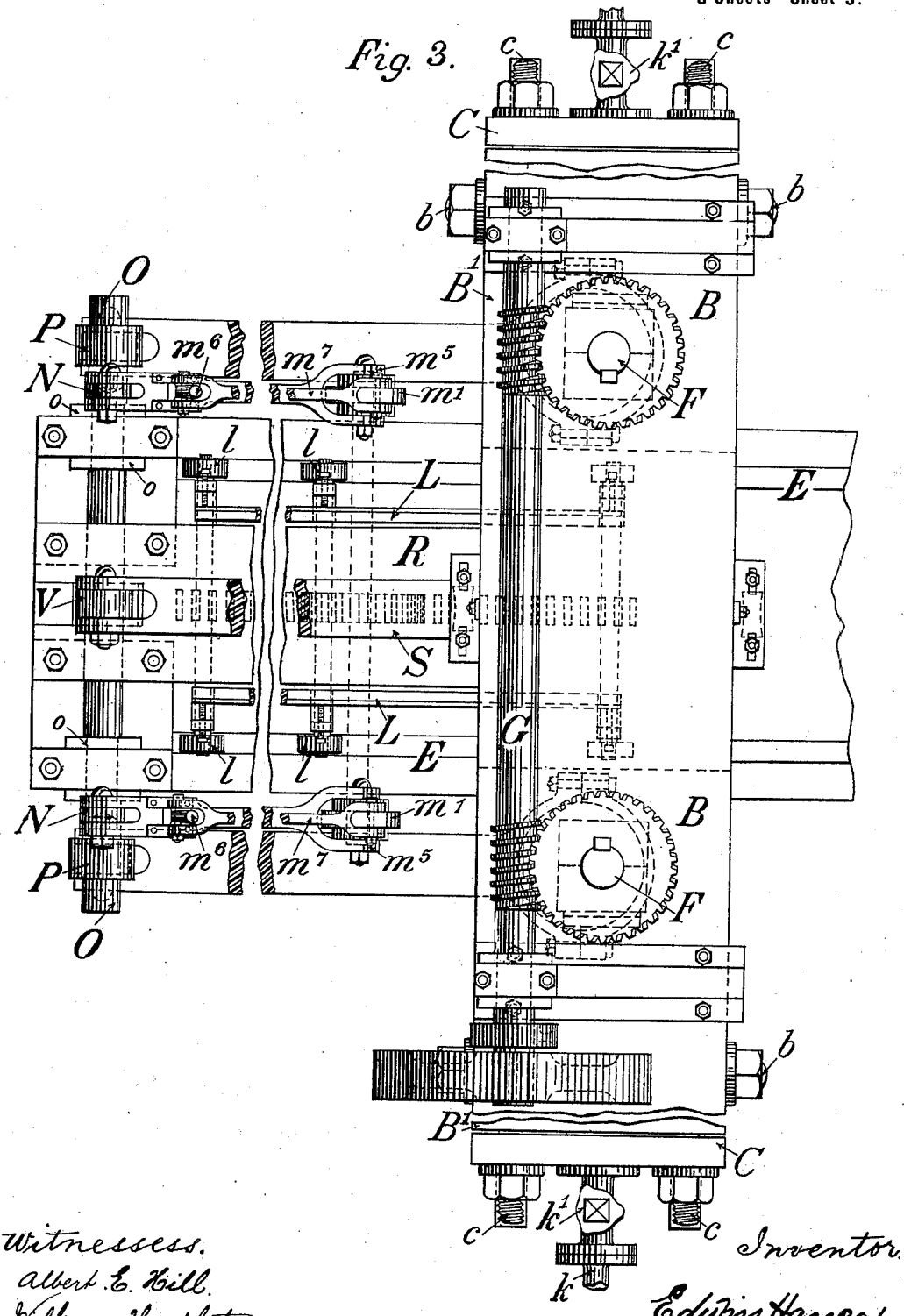

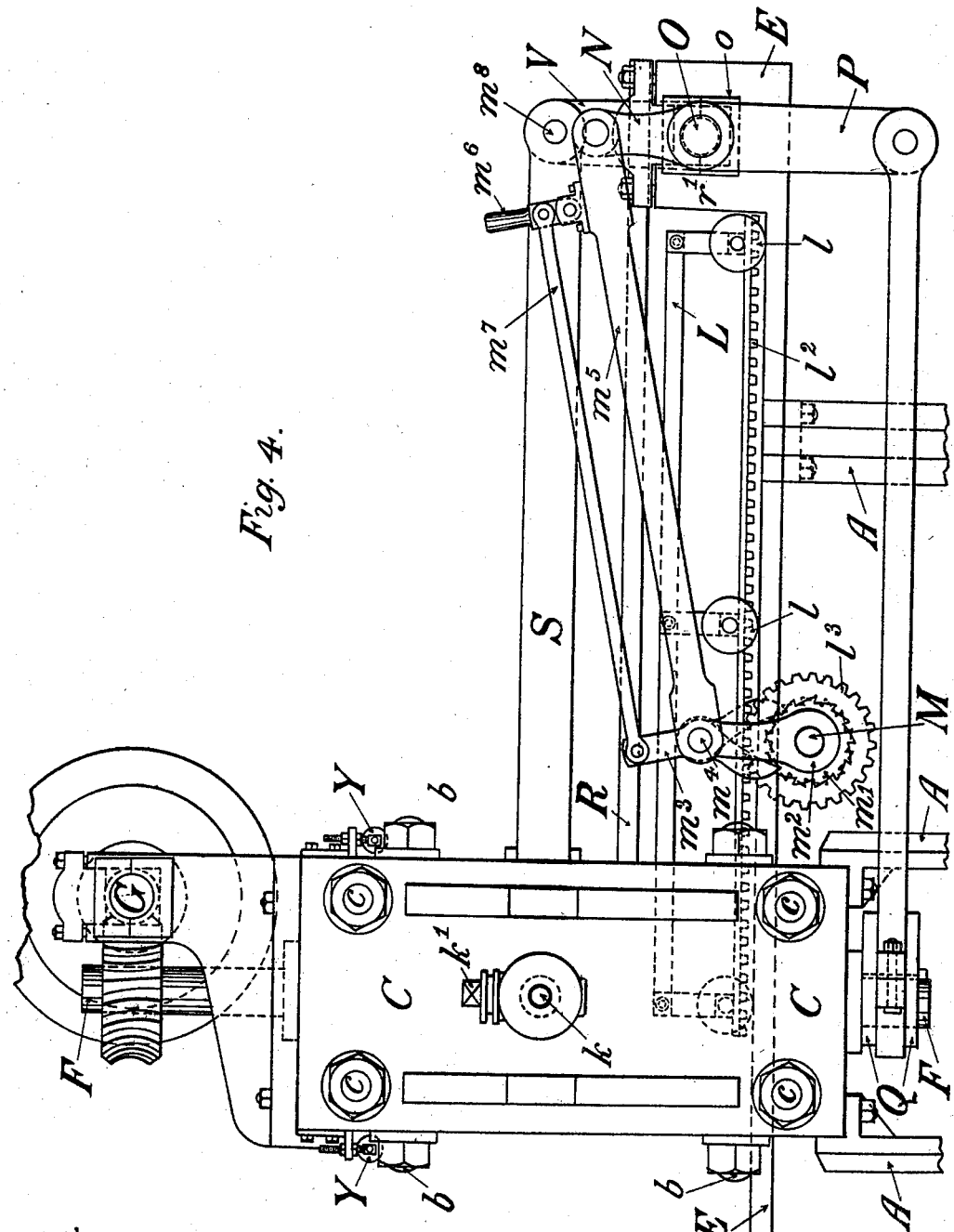

No. 668,331. Patented Feb. 19, 1901.
E. HANCOX.
PIPE MAKING MACHINE.
(Application filed Sept. 22, 1900.)
(No Model.) 8 Sheets—Sheet 5.
Fig. 12.
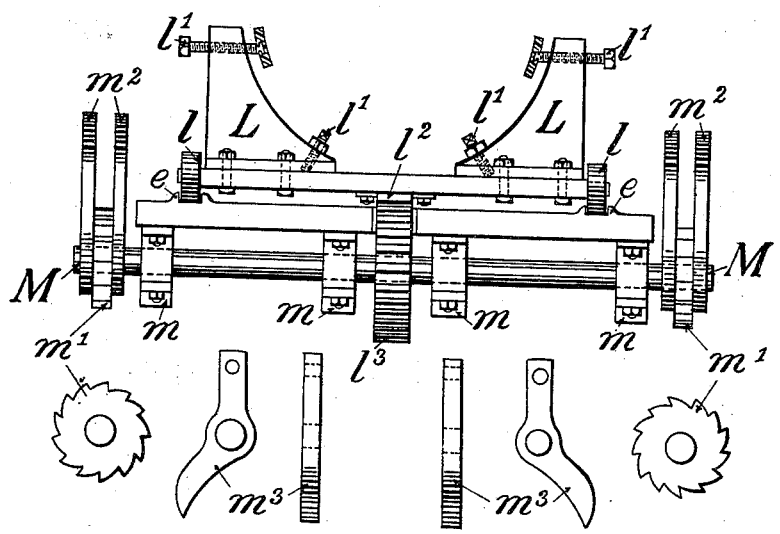
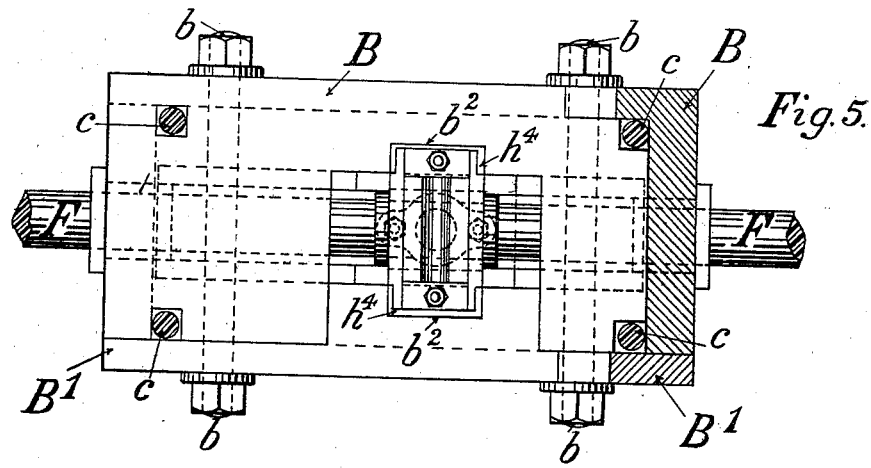
Fig. 5.
Witnesses.
Albert E. Hill
William Hadlet
Inventor.
Edwin Hancox.

No. 668,331. Patented Feb. 19, 1901.
E. HANCOX.
PIPE MAKING MACHINE.
(Application filed Sept. 22, 1900.)
(No Model.) 8 Sheets—Sheet 6.
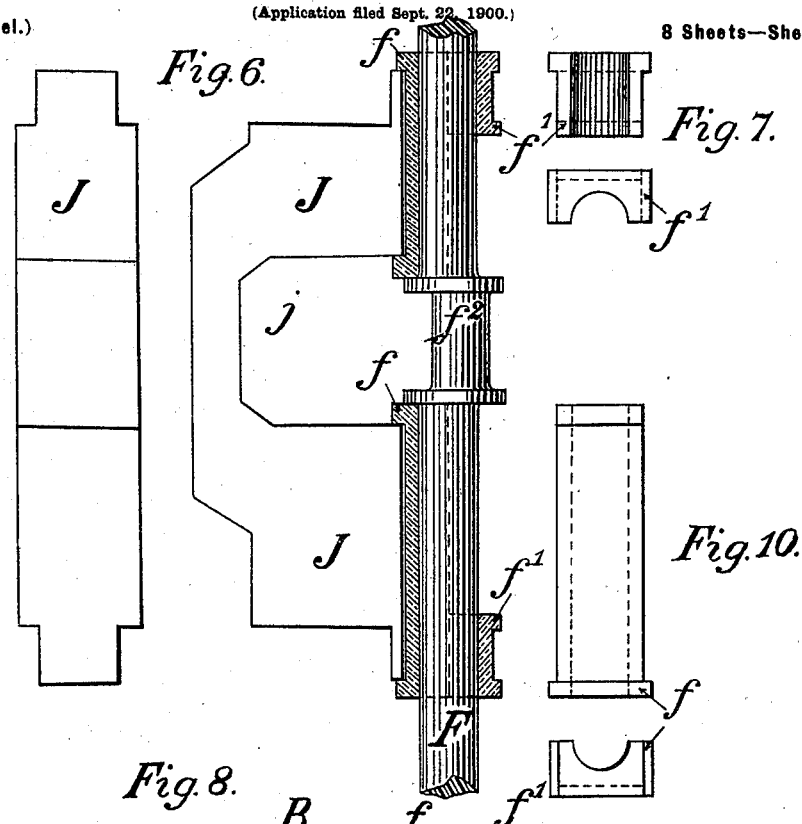
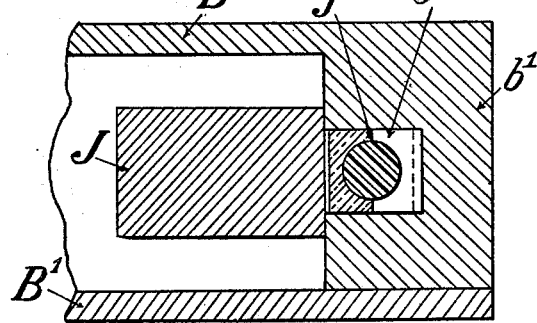
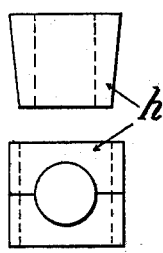
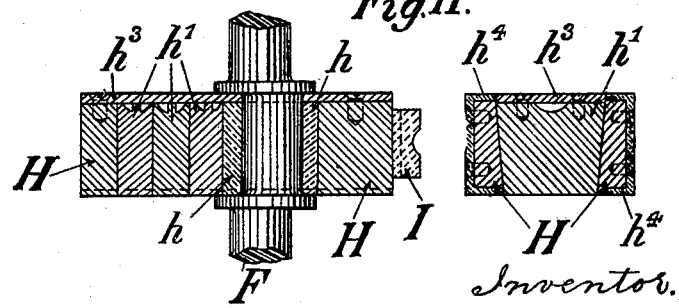
Witnesses.
Albert E. Hill.
William Hadlet.
Inventor.
Edwin Hancox.
THE NORRIS PETERS CO., PHOTO-LITHO., WASHINGTON, D. C.

No. 668,331. Patented Feb. 19, 1901.
E. HANCOX.
PIPE MAKING MACHINE.
(Application filed Sept. 22, 1900.)
(No Model.) 8 Sheets—Sheet 7.

Witnesses.
Albert E. Hill.
William Hadlet.

Inventor.
Edwin Hancox.

THE NORRIS PETERS CO., PHOTO-LITHO., WASHINGTON, D. C.

No. 668,331. Patented Feb. 19, 1901.
E. HANCOX.
PIPE MAKING MACHINE.
(Application filed Sept. 22, 1900.)
(No Model.) 8 Sheets—Sheet 8.
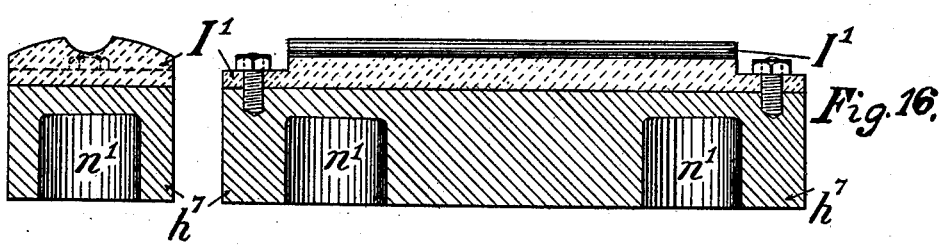
Fig. 16.
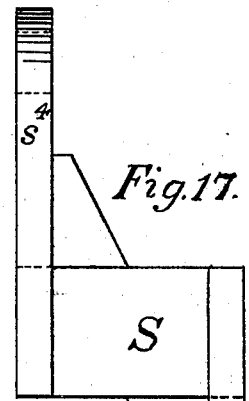
Fig. 17.
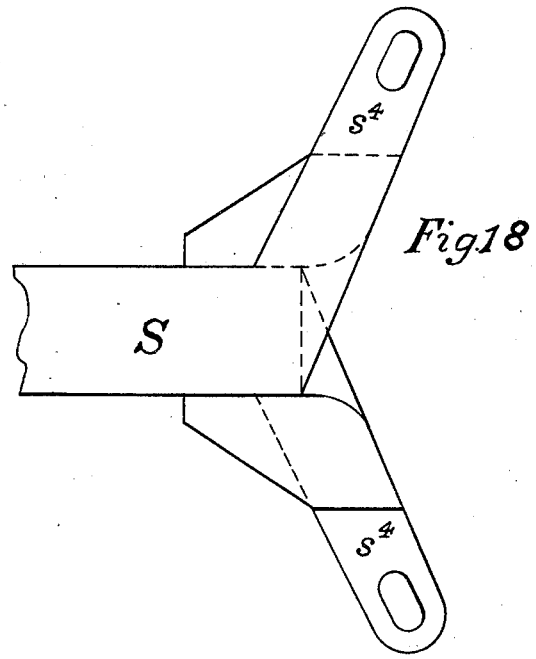
Fig. 18.
Fig. 19.
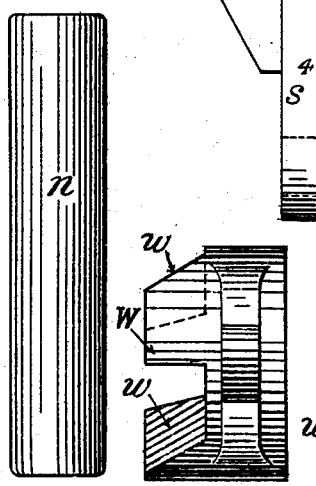
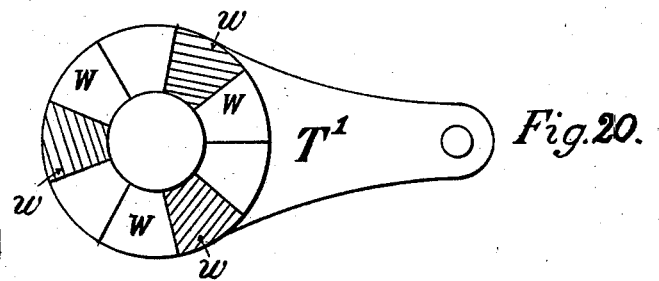
Fig. 20.
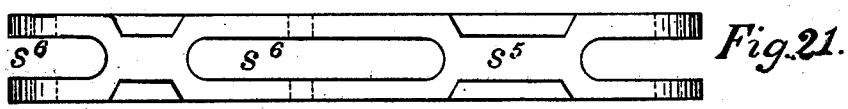
Fig. 21.
Fig. 22.
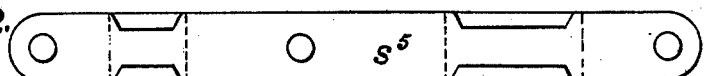
Witnesses
Albert E. Hill.
William Hadlet.
Inventor
Edwin Hancox.
THE NORRIS PETERS CO., PHOTO-LITHO., WASHINGTON, D. C.

UNITED STATES PATENT OFFICE.

EDWIN HANCOX, OF STOCKTON-ON-TEES, ENGLAND.

PIPE-MAKING MACHINE.

SPECIFICATION forming part of Letters Patent No. 668,331, dated February 19, 1901.

Application filed September 22, 1900. Serial No. 30,874. (No model.)

*To all whom it may concern:*

Be it known that I, EDWIN HANCOX, a subject of Her Majesty Queen Victoria, residing at 8 Dixon street, Stockton-on-Tees, in the county of Durham, England, have invented a new and useful Pipe-Making Machine, of which the following is a specification.

Certain kinds of rivetless pipes are manufactured by upsetting the edges of metal plates, so as to give such edges a dovetail or approximately dovetail section, then bending such plates into an arc of a circle, and finally securing together adjacent upset edges by means of a locking bar or bars of H-section, which, having been placed in position, are closed over such upset edges, so as to grip the same closely and form a perfectly-tight joint. The present invention is designed to provide simple and effective machinery or apparatus whereby the closing of said H-section locking-bars upon the plate edges is effected in an absolutely automatic manner throughout the entire length of the pipe.

I will now fully describe my invention and the manner of performing the same with reference to the accompanying drawings, wherein—

Figure 1:
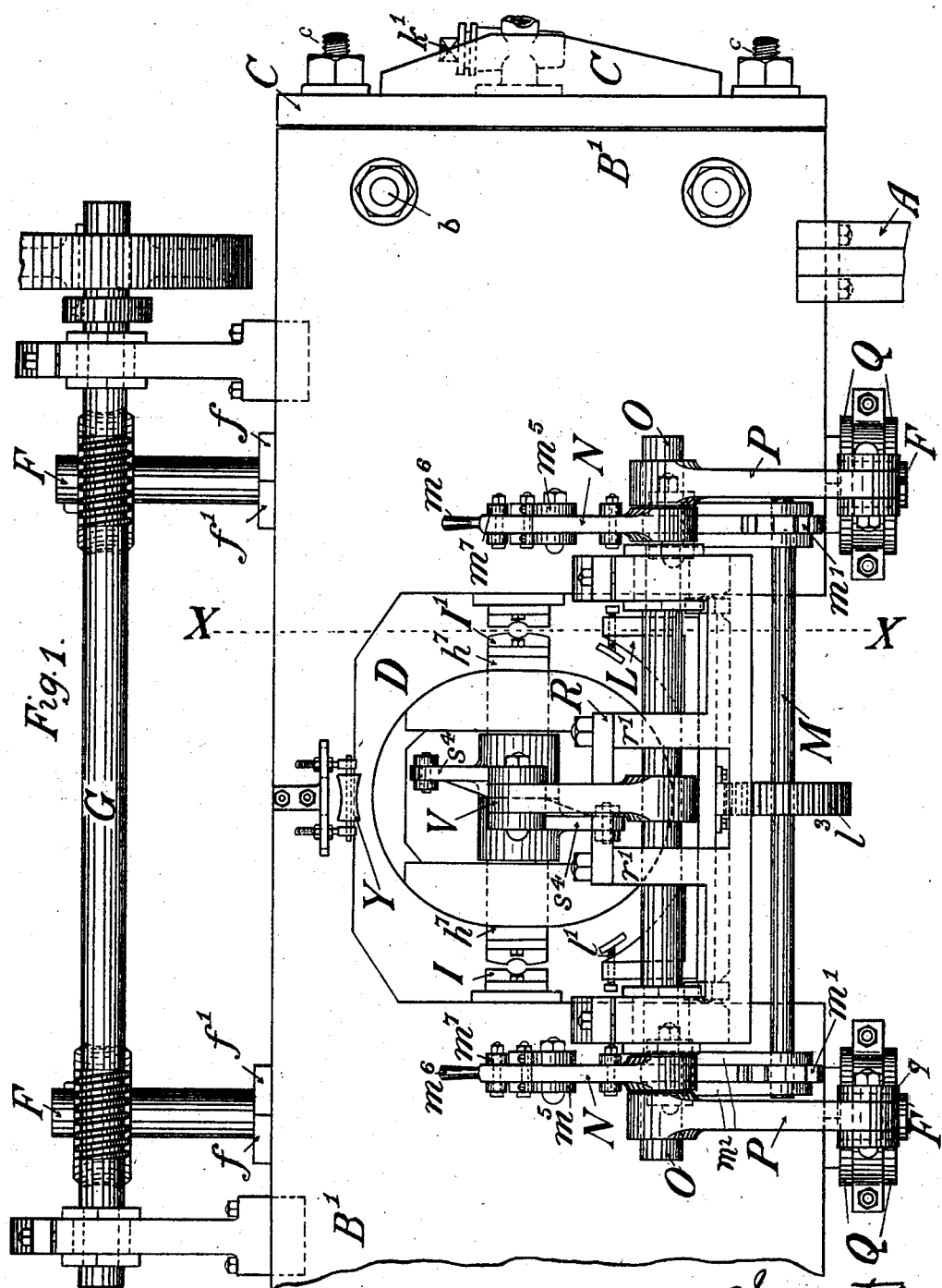
Figure 2:
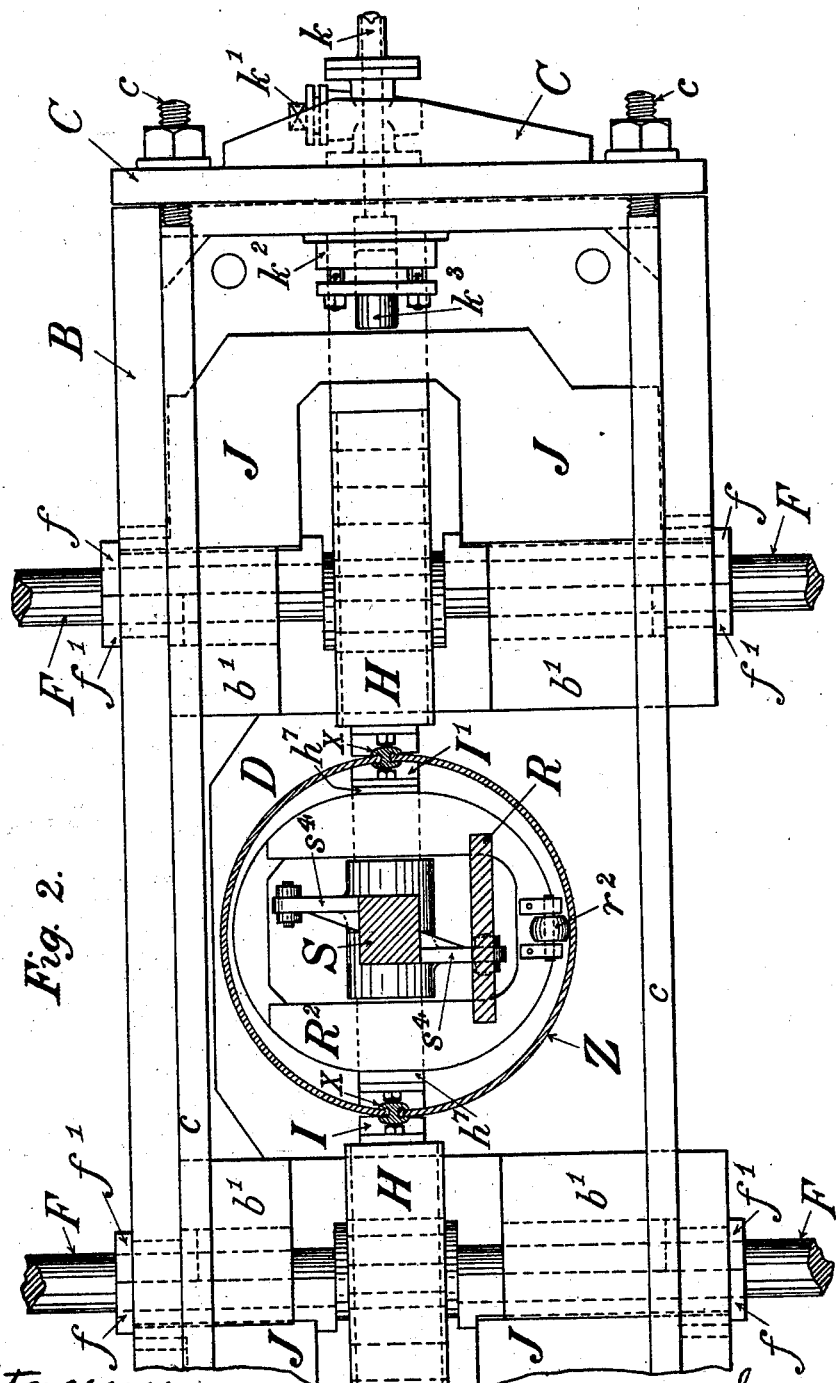
Figure 13:
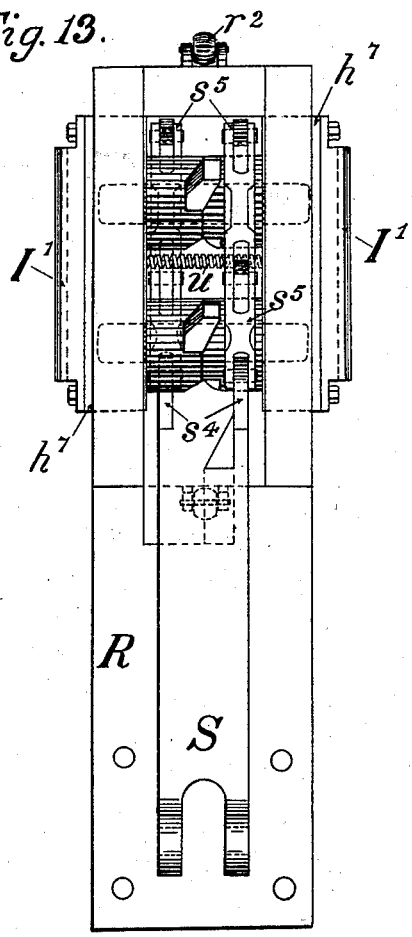
Figure 14:
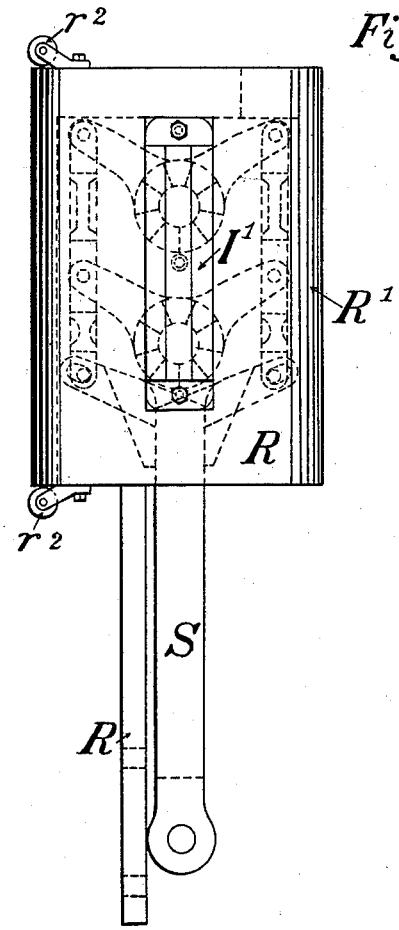
Figure 15:
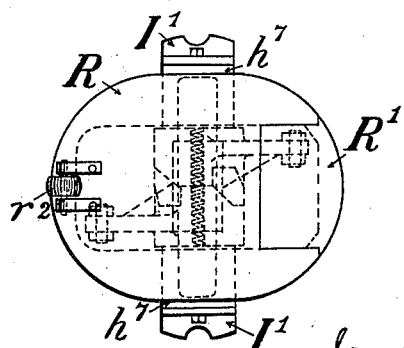

Figure 1 is a front elevation of machinery or apparatus for the purpose set forth constructed in accordance with my invention. Fig. 2 is a similar view, the bed-plate and the appurtenances and also the front cover-plate of the frame or casting being removed. Fig. 3 is a plan, and Fig. 4 an end view, of Fig. 1. Fig. 5 is a transverse vertical section on the line $x\ x$, Fig. 1, the cover-plate being shown in place. Figs. 6 to 12 are details hereinafter described. Fig. 13 is a plan of the expanding-mandrel, the top cover of the body or case being removed. Figs. 14 and 15 are side and end elevations, respectively. Figs. 16 to 22 are details.

Similar letters refer to like parts in all the figures.

A A are suitable standards or supports which carry the main frame or casing of the machine, the top, bottom, and one side of the latter being formed of a single casting B and the other side consisting of a cover-plate B', which is secured to B by the bolts $b$. C C are end plates which fit into and close the ends of the said frame and are held together by strong bolts $c\ c$. A gap or space D is left centrally of the frame and is traversed by the bed-plate E and its appurtenances, as hereinafter described.

$b'\ b'$ are inwardly-projecting stop-blocks formed on the casting B, and $b^2$ represents guide-ways formed in said casting and its cover-plate B', respectively. The function of these stop-blocks and guideways will hereinafter appear.

F F are shafts journaled in bearings in the top and bottom plates of the casting B, the bearing-brasses $f f'$ fitting within slots in said plates, so as to be movable to a slight extent toward and from one another. The said shafts F have slow and powerful rotary motion imparted thereto by worm and worm-wheel gear from the main shaft G, carried in bearings on the top of the casting B.

$f^2$, Fig. 6, represents crank-pins or eccentrics on the shafts F, which work within bearings carried by the slides H, the latter traveling to and fro in the guideways $b^2$, before referred to. The construction of these slides H will be more fully described hereinafter.

I I are closing tools carried by the slides H aforesaid. The acting faces of these tools, as also those of the tools I', hereinafter referred to, conform in shape with the shape into which the H-section locking-bars $x$ are to be compressed.

J J are blocks which slide between the top and bottom plates of B and are normally kept pressed against the stop-blocks $b'$, before referred to, (see Fig. 8,) by hydraulic rams $k^3$, the cylinders $k^2$ of which are carried by or formed in the end plates C. $k$ represents the pipes leading from the hydraulic accumulators, and $k'$ the regulating-valves thereof. The said blocks J are made with central openings $j$ to admit the slides H, Figs. 2 and 6, and their front edges, which are adapted to bear against the whole length of the longer brasses $f$ of the bearings of the shafts F, are normally kept just clear of these brasses by the stop-blocks $b'$, as shown clearly in the detail Fig. 8. The object of these blocks $b'$ is to keep the pressure of the sliding blocks J from off the shaft-bearings until the latter yield apart, owing to the tools I being closed upon the locking-bars $x$ of the pipe Z between them by the eccentrics $f^2$. I thus avoid the grinding and wear of the shafts and bearings which would otherwise result. When, however, the tools I are closed upon the pipe by the revolution of the eccentric-carrying shafts F, said shafts are forced apart against the blocks J, which then receive the thrust. The outside brasses $f$ of the shaft-bearings are made as long as possible, so as to distribute the stress and avoid bending the shafts F.

The motion of the tools I is of course limited by the throw of the eccentrics or cranks $f^2$, which reciprocate their carrying-slides H, and since the machine may be required to operate upon pipes which vary greatly in size means must be provided for setting the said tools nearer together or farther apart, as circumstances may require. This is readily effected in the following manner:

The bearing-brasses $h$, Figs. 9 and 11, of the crank-pins or eccentrics $f^2$ are dropped within slots extending longitudinally of the said slides H and made of rather less width at the bottom than the top. Also dropped within the said slots, so as to fill up the remaining space, are the distance-pieces $h'$, provided with convenient sunk handles for facilitating their manipulation. By shifting one or more of these distance-pieces from one side of the bearings $h$ to the other the separation of the tools I may be adjusted to suit the diameter of the pipe to be operated upon.

$h^3$ is a cover-plate screwed to the top of the slides for keeping the distance-pieces in position, and $h^4$ represents brasses covering the sides and edges of the slides H where they travel in the guideways $b^2$.

E, Figs. 1, 3, and 4, is the bed-plate of the machine, which passes through the gap or opening D aforesaid in the main frame and rests on the bolts $c$, before referred to, being also supported by suitable standards A. The rear end of the bed-plate, which should extend some distance in the rear of the machine, is broken away in the drawings. On the upper surface of the bed-plate E are longitudinal guide-grooves $e$, Fig. 12, in which run rollers $l$, supporting a traveling cradle L, which receives the pipe of which the joints are to be closed, the position of said pipe being capable of fine adjustment by the screws $l'$. Beneath the cradle L is a rack $l^2$, engaged by a pinion $l^3$, carried by a shaft M, mounted in bearings $m$ beneath the bed-plate and having at either end a ratchet-wheel $m'$, the teeth of one ratchet-wheel being set in the reverse direction to those of the other. Each ratchet-wheel $m'$ is embraced by arms $m^2$, which pivot on the shaft M. Between the free ends of these arms $m^2$ are pivotally mounted the pawls $m^3$, which operate the ratchet-wheels. Pivoted to the free ends of each pair of arms $m^2$ by means of the pawl-pivots $m^4$ is one end of a connecting-rod $m^5$, of which the other end is pivotally connected with a lever-arm N, carried by a rock-shaft O, mounted in bearings $o$, carried by the bed-plate E. Dependent from this shaft O are the lever-arms P, to which motion is imparted from the eccentrics Q, mounted on the lower ends of the shafts F, before referred to, by the connecting-rods $q$, which carry straps $q'$, embracing said eccentrics. The cradle is thus caused to travel automatically longitudinally of the bed-plate E in one direction or the other, according as one or other pawl $m^3$ is in action. Either pawl is thrown out of action by means of lever-handles $m^6$, which operate rods $m^7$, pivotally connected with the pawl-tails.

The H-section locking-bars $x$ are closed upon the pipe-sections Z between the tools I, carried by the slides H, before referred to, and similar tools I', carried by a stationary mandrel located within the pipe, said tools I' being automatically forced outward the moment before the tools I are forced inward and automatically retracted simultaneously with the said tools I. This automatic action of the mandrel-tools is one of the features of my invention. The automatic expansion and contraction of the tools I' are effected in the manner hereinafter described.

I will now describe the construction of mandrel as illustrated in Figs. 13 to 22. The body of the mandrel is mounted on one end of a plate R, of which the other end is securely bolted to the raised blocks $r'$ on the bed-plate E. Beneath the mandrel are rollers $r^2$, which rest on the interior surface of the pipe under treatment, as shown in Fig. 2. Guideways are formed in the cover-plate and casting, in which slides the reciprocating rod S. The free end of the rod S is pivotally and detachably connected with a lever-arm V, mounted centrally of the shaft O aforesaid, and the eccentrics Q are so timed that the inward thrust of the rod S, which expands the tools I', will take place the moment before the tools I are closed upon the locking-bars by the cranks or eccentrics $f^2$. Between each grip of the closing tools I I' upon the said locking-bars the ratchets $m'$ are automatically operated, as above described, causing the cradle L to travel along the bed-plate E, the direction of travel depending upon which ratchet-wheel $m'$ is in engagement with its pawl $m^3$. The carrying-plate R of the mandrel is fixed to the bed-plate blocks $r'$, and the automatic expansion of the tools I' is effected by the reciprocation of the rod S, which connects detachably with the lever-arm V. The mandrel-body comprises a suitable casting $R^2$ and a cover-plate R', bolted thereto. Within the casting $R^2$ are two pairs of levers T', Fig. 20, the bosses of which pivot upon and are free to slide longitudinally of pins $n$, Fig. 19, the extremities of the latter fitting into holes $n'$ in the tool-carrying plates $h^7$, Fig. 16. The opposed faces of the lever-bosses are each formed with flat-topped projections W, each projection having an inclined side $w$. The projections W of one lever-boss fit within the spaces between those of the opposed boss, inclined sides $w$ being adjacent, so that if the levers T' of either pair are turned in reverse directions upon their axes $n$ the inclined sides $w$ of the projections W ride up one another, forcing the levers apart until the flat tops or tables of the projections W seat themselves upon one another. The outer sides of the lever-bosses bear against the tool-carrying plates $h^7$, so that the forcing apart of the lever-bosses expands the tools I'. The several levers T' are simultaneously operated from the rod S by providing the end of the latter with two arms $s^4$, Figs. 17 and 18, connected by pins and slots with connecting rods or links $s^5$, Figs. 21 and 22, said links being formed with slots $s^6$, within which the ends of the levers T' are pivoted. In the drawings the tools I' are shown as expanded to the full extent by the levers T'. When the rod S is drawn to the right, the said levers will be turned so that the projections W on the boss of one lever come opposite to the spaces between the projections of the opposed boss, which permits the tools I' to be retracted by suitable springs, such as $u$, connecting their carrying-blocks $h^7$, as indicated in Figs. 14 and 15. $r^2$ represents rollers supporting the mandrel-body.

It will be noted that the mandrel is so constructed that when the tools I' are fully expanded, as illustrated, a rigid resistance-block is produced, which extends between the inner faces of the locking-bars $x$ when the mandrel is in position.

Y Y, Figs. 1 and 4, are rollers vertically adjustable in brackets secured to the casting B and its cover-plate B', respectively, and adapted to bear on the top surface of the pipe undergoing treatment, so as to hold the same firmly in the cradle L.

The operation of the machine is as follows: The tools I are set the proper distance apart to suit the size of the pipe to be operated upon by arranging or shifting the distance-pieces $h'$ of the slides H, as before explained, and the plate R of a mandrel of suitable size is secured to the raised blocks $r'$ of the bed-plate E. The lever-operating rod S of the mandrel is also coupled to the lever-arm N of the rock-shaft O. It having been decided what is to be the maximum closing pressure of the tools I, the hydraulic apparatus is arranged to impart this pressure to the blocks J through the rams $k^3$. The cradle L is then run out at the rear of the machine and the pipe-sections, with the H-section locking-bars $x$ fitted thereon, are laid in position on the cradle and finely adjusted by the screws $l'$, so that said locking-bars will come exactly opposite to the tools I I'. The rollers Y are also adjusted so as to bear on the top of the pipe Z. The cradle L is then run back to its original position again until the rear end of the pipe reaches to or nearly to the rear ends of the closing tools I I'. The machine may now be started and will work automatically in the manner before explained, alternately compressing lengths of the H-section locking-bars $x$ and then feeding forward the cradle L, so as to bring a fresh length of the locking-bars between the closing tools until closing of the locking-bars has been effected throughout the entire length of pipe carried by the cradle.

The actual working of the various parts is as follows: The eccentrics Q through the links $q$, connected with the levers P of the rock-shaft O, cause the lever V to push inward the rod S, and thus to thrust out the mandrel-tools I'. A rigid resistance-block is thus formed between the inner faces of the locking-bars $x$, upon the outer faces of which the tools I are immediately closed by the eccentrics $f^2$. The moment the tools I I' loose their grip upon the locking-bars the connecting-rods $m^5$ are caused by the levers N, also carried by the rock-shaft O, to actuate one of the pawls $m^3$ and through its ratchet-wheel $m'$ to feed forward the cradle L. To prevent motion of the connecting-rods $m^5$ while the cradle is locked against movement by the grip of the closing tools on the locking-bars $x$, I make provision for a certain amount of lost motion where said rods $m^5$ connect with the levers N, as by elongating the holes through which the pivot-pins $m^8$ pass. This lost motion commences with the inpush of the mandrel-rod S and terminates the moment the subsequent grip of the closing tools is released, when the motion is at once taken up again and the connecting-rods $m^5$ actuated. Directly the tools I close upon the locking-bars $x$ of the pipe the bearings of the shafts F are forced against the blocks J, which thus take up the thrust, and should the predetermined pressure be exceeded the rams $k^3$ will give way, thus permitting said shafts F to yield apart and avoiding all risk of injury to the pipe and apparatus.

It will be noted that the hydraulic rams $k^3$ have no positive action on the closing tools I, the pressure of which is effected solely by the eccentric-carrying shafts F, but merely act as safety cushioning devices to the latter. Were it not for these cushioning devices, which are one of the essential features of my invention, material of extra thickness coming between the tools I I' (and the pipe material is of course liable to slight variations in thickness) would very probably cause the breakage or stoppage of the apparatus.

Having now particularly described and ascertained the nature of the said invention and in what manner the same is to be performed, I declare that what I claim is—

1. In machinery or apparatus for the purpose set forth, a pair of closing tools I, reciprocated by shafts F, mounted in sliding bearings, in combination with hydraulic cushion devices adapted to receive the thrust of said bearings when the tools are closed upon the pipe, whereby the maximum pressure of the tools is regulated, substantially as described.

2. In machinery or apparatus for the purpose set forth, closing tools I, operated by the rotation of shafts F, in combination with hydraulically-cushioned blocks applied to the bearings of the latter, a stationary mandrel having expanding closing tools I', disposed between the tools I, and means for automatically effecting the expansion of the mandrel-tools by the rotation of said shafts F, whereby the automatic acting in unison of the tools I, I' is insured, substantially as described.

3. In machinery or apparatus for the purpose set forth, the combination of closing tools I, operated by shafts F, hydraulic cushioning devices applied to the bearings of the latter, a stationary mandrel having expanding closing tools I', arranged between the tools I, a cradle such as L, adapted to travel longitudinally of the mandrel, and means whereby the expansion of the mandrel-tools and the travel of the cradle are both automatically effected by the rotation of said shafts F, thereby insuring the automatic acting in working agreement of the tools I, I' and the cradle L, substantially as described.

4. In machinery or apparatus for the purpose set forth, the combination of the slides H working in guideways in a suitable frame, and carrying the tools I, the shafts F reciprocating said slides and having yielding bearings, the sliding blocks J adapted to receive the thrust of said bearings, the hydraulic rams bearing against the rear of said sliding blocks and the stop-blocks $b'$, substantially as described.

5. In machinery or apparatus for the purpose set forth, the combination of a frame B, B', having at each end guideways $b^2$, and a central gap or opening D, slides H carrying closing tools, and reciprocated in said guideways by shafts F, hydraulically-cushioned blocks applied to said shafts, a bed-plate E traversing said gap D, and carrying a traveling cradle L, and a stationary mandrel having expanding closing tools I', and means whereby the travel of the cradle and the expansion of the mandrel-tools are automatically effected from eccentrics Q, on said shafts F, substantially as described.

6. In machinery or apparatus for the purpose set forth, the combination of the cradle L, adapted to carry the pipe between closing tools I, I', and provided with screw adjustment $l'$, the rack $l^2$ carried by the cradle and engaged by the pinion $l^3$, the ratchet-wheels $m'$, set with their teeth in reverse directions on the pinion-shaft, and the pawls $m^3$ adapted to engage with said ratchets, and actuated by suitable connections from the gear which operates the closing tools, means being provided for throwing either pawl out of action at will, whereby the cradle may be automatically caused to travel in reverse directions in unison with the closing tools, substantially as described and illustrated.

7. In machinery or apparatus for the purpose set forth, the combination with closing tools I, operated by shafts F, of a stationary mandrel having closing tools I', expanded by the reciprocation of a rod S, a cradle L, caused to travel longitudinally of a mandrel by a ratchet-and-pawl-operated rack-and-pinion movement, a rock-shaft O, actuated by connections from eccentrics Q, on said shafts F, and connections between lever-arms carried by said rock-shaft and the rod S, and cradle-operating pawl respectively, whereby the tools I, I', and the cradle L, are all automatically caused to work in unison, substantially as described and illustrated.

In testimony whereof I have signed my name to this specification in the presence of two subscribing witnesses.

EDWIN HANCOX.

Witnesses:
   T. W. MALKIN,
   GEO. APPLEBY.